US012655709B1

(12) United States Patent
Villarreal et al.

(10) Patent No.: US 12,655,709 B1
(45) Date of Patent: Jun. 16, 2026

(54) DRILLABLE SEAT FOR MULTI-STAGE TOOLS

(71) Applicant: Halliburton Energy Services, Inc., Houston, TX (US)

(72) Inventors: Frank Vinicia Acosta Villarreal, Houston, TX (US); Saul Vazquez Niebla, Houston, TX (US); Ahmad Rizal Maharam, Senai (MY)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/212,913

(22) Filed: May 20, 2025

(51) Int. Cl.
| | |
|---|---|
| *E21B 33/12* | (2006.01) |
| *C09K 8/42* | (2006.01) |
| *C09K 8/46* | (2006.01) |
| *E21B 33/13* | (2006.01) |
| *E21B 34/14* | (2006.01) |

(52) U.S. Cl.
CPC .......... *E21B 33/1204* (2013.01); *C09K 8/426* (2013.01); *C09K 8/428* (2013.01); *C09K 8/46* (2013.01); *E21B 34/142* (2020.05); *E21B 33/13* (2013.01)

(58) Field of Classification Search
CPC .... E21B 33/1204; E21B 34/142; E21B 33/13; C09K 8/426; C09K 8/428; C09K 8/46
See application file for complete search history.

(56) References Cited

U.S. PATENT DOCUMENTS

| | | | | |
|---|---|---|---|---|
| 4,110,225 | A | * | 8/1978 | Cagle ................... C09K 8/5045 |
| | | | | 507/144 |
| 5,909,771 | A | | 6/1999 | Giroux et al. |
| 6,955,181 | B1 | | 10/2005 | Blume |
| 11,873,696 | B1 | | 1/2024 | Acosta Villarreal et al. |
| 11,965,397 | B2 | | 4/2024 | Helms |
| 2014/0224479 | A1 | | 8/2014 | Andrigo |
| 2015/0167424 | A1 | * | 6/2015 | Richards ................ C09K 8/487 |
| | | | | 166/386 |
| 2018/0266204 | A1 | | 9/2018 | Sherlin |
| 2020/0232283 | A1 | * | 7/2020 | Bangert ................. E21B 44/00 |
| 2024/0026754 | A1 | | 1/2024 | Helms |

* cited by examiner

*Primary Examiner* — Crystal J Lee
(74) *Attorney, Agent, or Firm* — Sheri Higgins Law, PLLC; Sheri Higgins

(57) ABSTRACT

A drillable seat for use in an oil and gas tool can include one or more sleeve shoulders located on an outside of the drillable seat, a plug shoulder located on an inside of the drillable seat, wherein the drillable seat is made from a settable material consisting of a cement composition or consisting essentially of a curable resin. The drillable seat can be connected to and located at a top portion of a sliding sleeve. The sliding sleeve can be part of a cementing tool and be an opening sleeve and/or a closing sleeve. A method of forming the drillable seat can include pouring a settable material into a seat mold located within the sliding sleeve and causing or allowing the settable material to set. The sliding sleeve can be a single unit or include upper and lower portions that are attached together after the settable material has set.

20 Claims, 7 Drawing Sheets

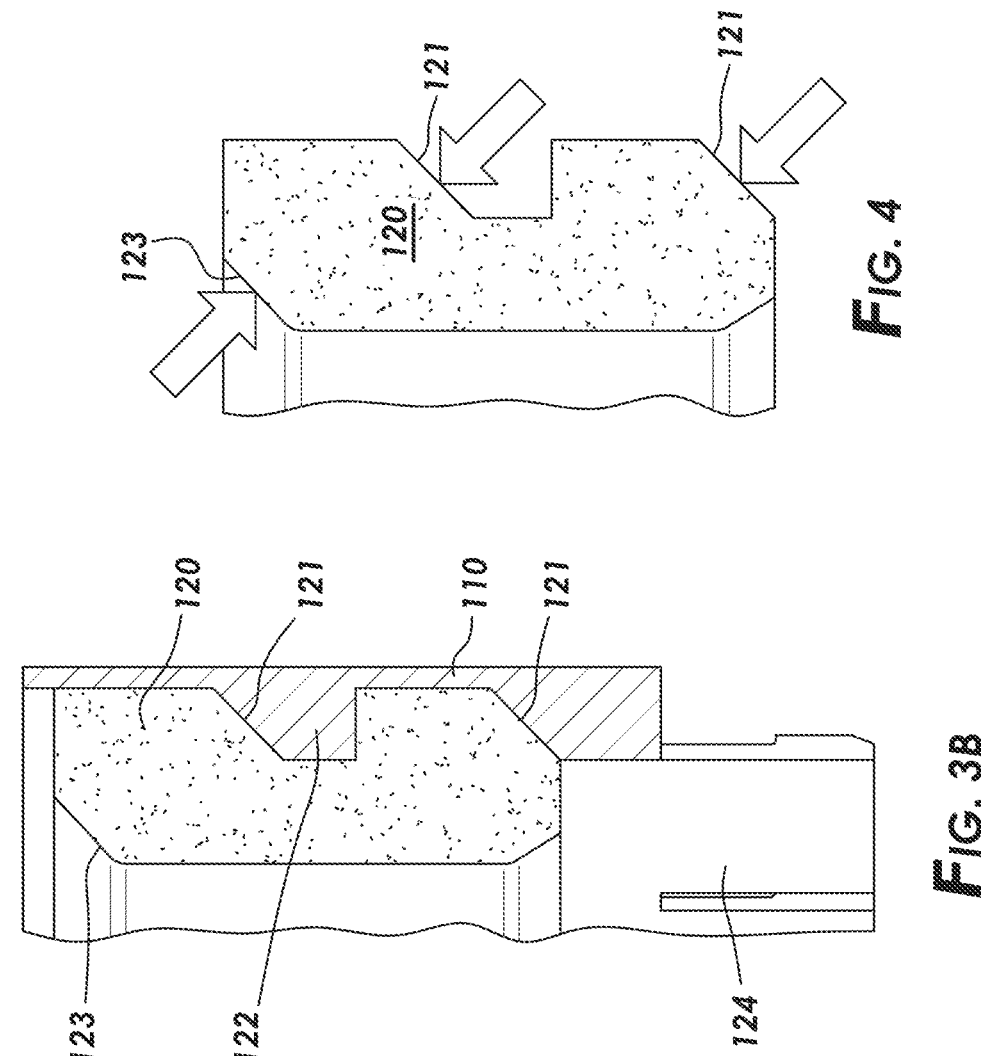
FIG. 4
FIG. 3B
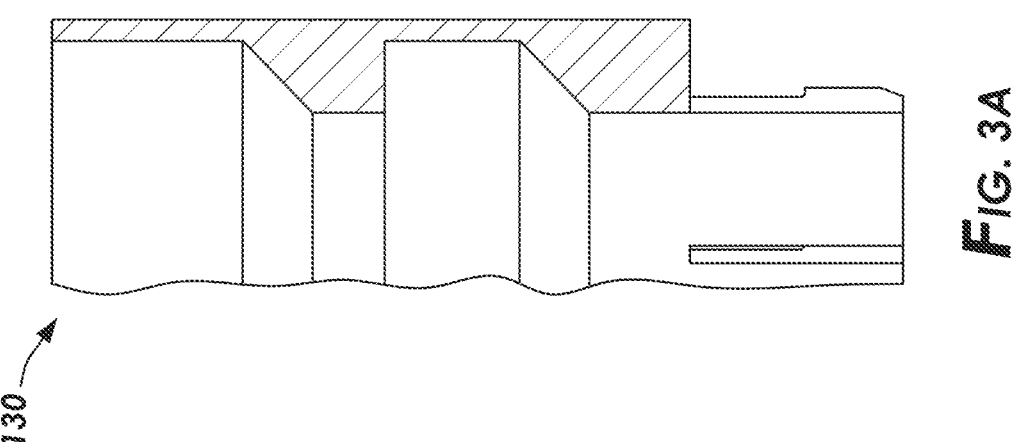
FIG. 3A

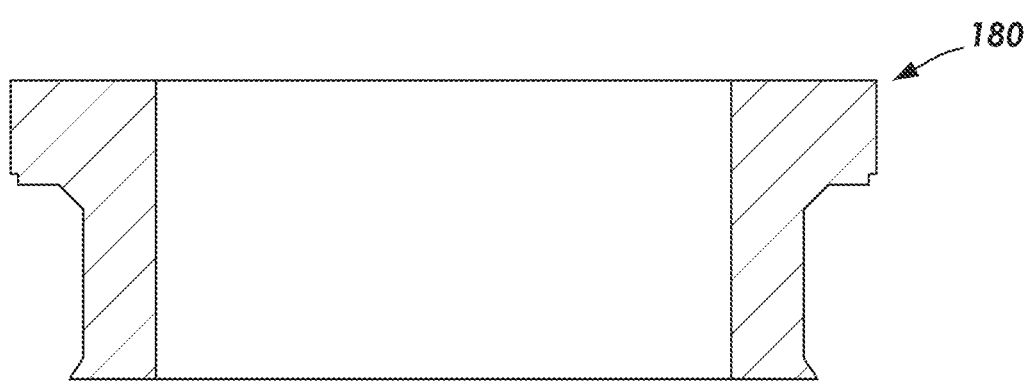
FIG. 9A
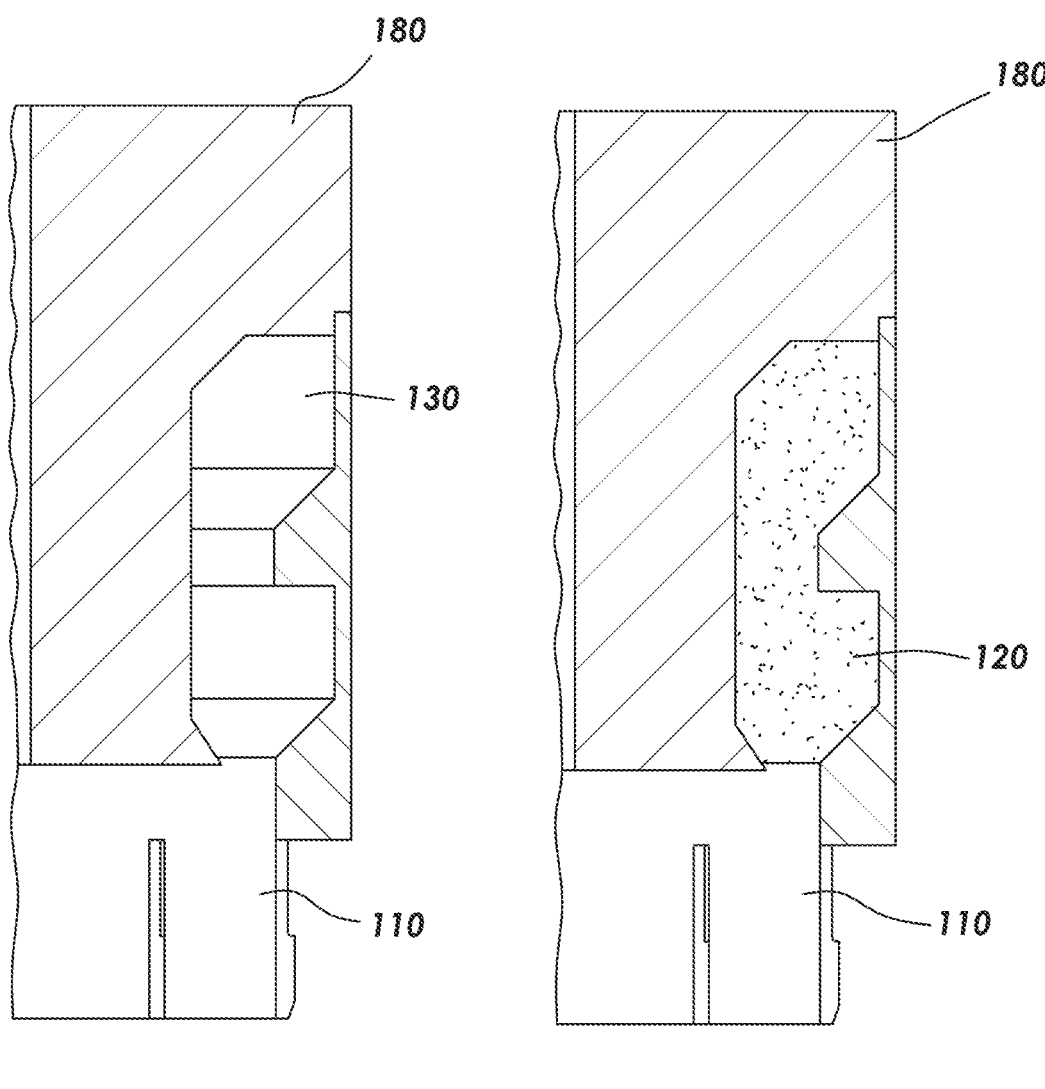
FIG. 9B          FIG. 9C

DRILLABLE SEAT FOR MULTI-STAGE TOOLS

TECHNICAL FIELD

The field relates to a drillable seat for oil and gas tools. The oil and gas tool can be a cementer for oil or gas operations. The drillable seat can be formed with a cement composition or other curable or settable composition. The drillable seat can include two or more sleeve shoulders. Methods of manufacture can include pouring a fluid form of the cement composition or other curable or settable composition directly into a seat mold.

BRIEF DESCRIPTION OF THE FIGURES

The features and advantages of certain embodiments will be more readily appreciated when considered in conjunction with the accompanying figures. The figures are not to be construed as limiting any of the preferred embodiments.

FIGS. 3A and 3B illustrate a seat mold and a fluid poured into the seat mold, respectively, according to any of the embodiments.

FIG. 4 illustrates a seat with 2 sleeve shoulders and a plug shoulder showing compressive forces exerted on the seat during shifting of a sliding sleeve.

FIG. 9A illustrates a tooling, FIG. 9B illustrates the tooling connected to a seat mold, and FIG. 9C illustrates a fluid poured into the seat mold according to any of the embodiments.

DETAILED DESCRIPTION

Figure 1:
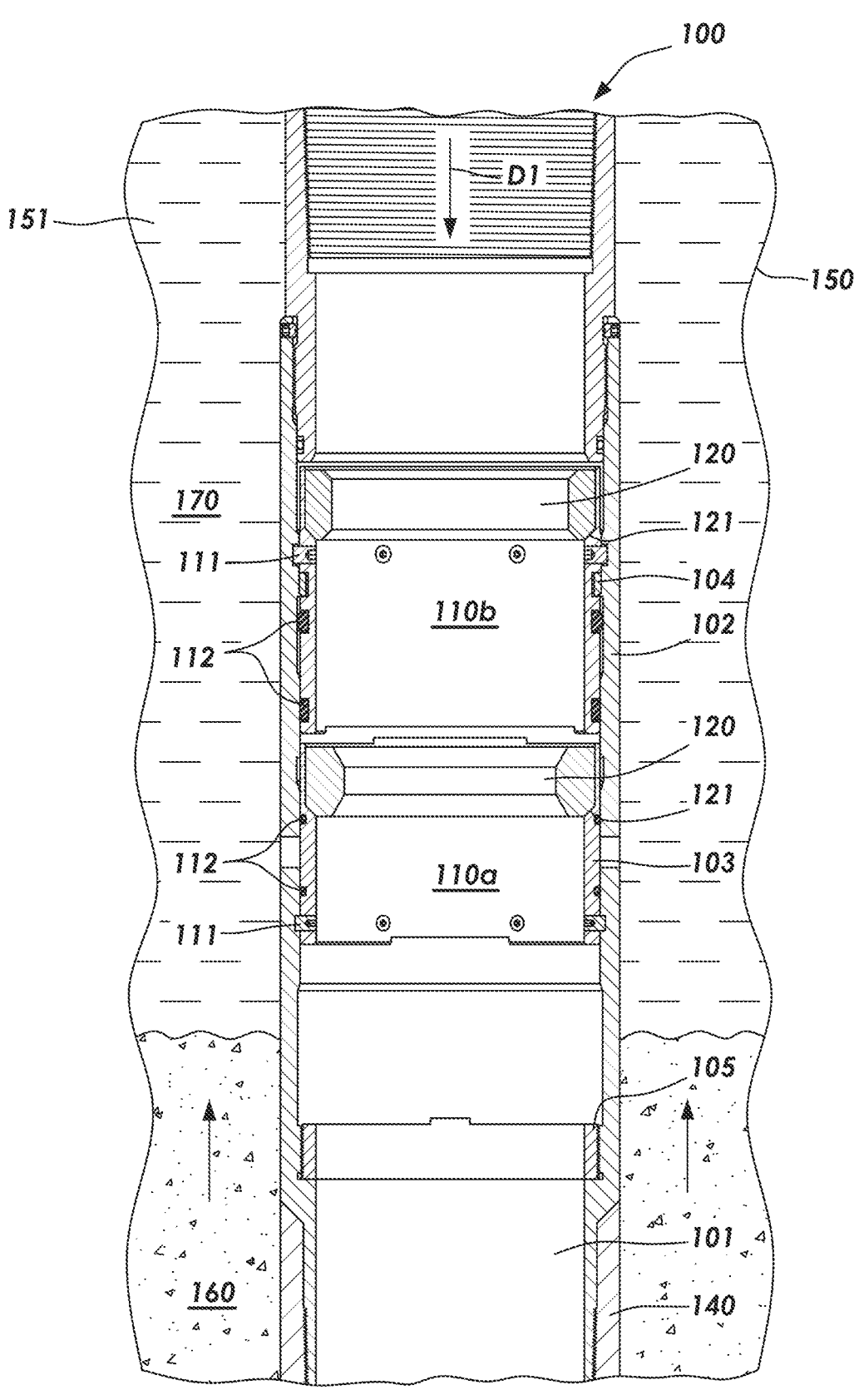
FIG. 1 illustrates a cementing tool in a wellbore with a cement displacing a drilling fluid or spacer fluid according to any of the embodiments.

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and at a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A wellbore is formed using a drill bit. A common type of drill bit is a polycrystalline diamond compact (PDC) bit. A drill string can be used to aid the drill bit in drilling into the subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wall of a wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in the annulus between the wellbore wall and the outside of the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing.

As used herein, a "cement composition" is a mixture of at least cement and water. A cement composition can include additives. As used herein, the term "cement" means an initially dry substance that develops compressive strength or sets in the presence of water. Some examples of cements include, but are not limited to, Portland cements, gypsum cements, high alumina content cements, slag cements, high magnesia content cements, sorel cements, and combinations thereof. A cement composition is a heterogeneous fluid including water as the continuous phase of the slurry and the cement (and any other insoluble particles) as the dispersed phase. The continuous phase of a cement composition can include dissolved substances, such as salt.

A spacer fluid can be introduced into the wellbore after the drilling fluid and before the cement composition. The spacer fluid can be circulated down through a drill string or tubing string and up through the annulus. The spacer fluid functions to remove the drilling fluid from the wellbore by pushing the drilling fluid through the casing and up into the annulus towards a wellhead.

A cement composition can then be introduced after the spacer fluid into the casing. Sometimes a spacer fluid is not used, and a cement composition can be introduced into the wellbore directly after the drilling fluid. There can be more than one stage of a cementing operation. Each stage of the cementing operation can include introducing a different cement composition that has different properties, such as density. A lead cement composition can be introduced in the first stage, while a tail cement slurry can be introduced in the second stage. Other cement compositions can be introduced in third, fourth, and so on stages.

A cement composition should remain pumpable during introduction into a wellbore. A cement composition will ultimately set after placement into the wellbore. As used herein, the term "set," and all grammatical variations thereof, are intended to mean the process of becoming hard or solid by curing. As used herein, the term "settable," and all grammatical variations thereof, are intended to mean a fluid that becomes hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days.

Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method. The destructive method mechanically tests the compressive strength of a cement composition sample taken at a specified time after mixing and by breaking the samples in a compression-testing device, such as an Enerpac hydraulic single cylinder press. According to the destructive method, the compressive strength is calculated as the force required to break the sample divided by the smallest cross-sectional area in contact with the load-bearing plates of the compression-testing device. The compressive strength is reported in units of pressure, such as pound-force per square inch (psi) or megapascals (MPa).

During first stage cementing operations, a first cement composition (e.g., a lead slurry) can be pumped from the wellhead, through the casing and a downhole tool such as a cementing tool, which can include a float shoe or collar, out the bottom of the casing, and into an annulus towards the wellhead. At the conclusion of the first stage, a shut-off plug can be placed into the casing, wherein the plug engages with a restriction near the bottom of the casing, such as a seat, and closes a fluid flow path through the casing.

After the casing has been shut off, an opening plug can be dropped into the casing. This plug can engage with a seat of the cementing tool that causes pressure to build up within the casing above this plug. When the pressure increases sufficiently, an opening sleeve of a cementing tool can shift downwardly to open flow ports that allow a fluid to flow from the inside of the casing into the annulus. After the flow ports have been opened via shifting of the opening sleeve, subsequent stages of the cementing operation can commence. Second-stage, third-stage etc. cement compositions can be pumped from the wellhead and through the inside of the casing and cementing tool, out the flow ports, and into the annulus.

When all stages of cementing have concluded, a closing plug can be pumped into the casing to engage with a seat on a closing sleeve of the cementing tool, thereby causing a closing sleeve to shift downwardly and close the flow ports. Once the ports are closed and before the cement slurries have set, it is common to pressure test the structural integrity of the casing. Pressure testing is performed by pumping a fluid into the casing and cementing tool until a sufficient amount of pressure is built up inside the casing and tool. The pressure placed on the tool can be on the order of approximately 80% of the casing strength rating.

In order to restore fluid communication through the casing, the closing plug and seat, the opening plug and seat, and the shut-off plug and seat can be drilled or milled out. A drillable seat or seats (e.g., opening sleeve seat and closing sleeve seat) are commonly made from a variety of materials. The material selected for the seat can have a sufficient compressive strength such that the seat can be easily drilled out yet withstand the pressure during shifting of the sleeves and pressure testing. However, shifting of the sleeves generally requires much less pressure than the pressure required during pressure testing. A common material used for drillable seats is aluminum. Aluminum seats are easy to drill out. However, a significant disadvantage to aluminum seats is during the drilling out process, metal shavings or smaller pieces of metal can become enmeshed within the drill bit and damage the drill bit. When this happens, the drill bit must be pulled out of the well, cleaned from the metal shavings or other debris, and then placed back in the well. If the drill bit is too badly damaged, the drill bit must be replaced with a new one. This requires more time and expense to clean or replace the drill bit.

To overcome the disadvantages of using aluminum seats, different materials have been used. Phenolic seats are still easy to drill out and do not produce metal shavings that clog the drill bit. However, a significant disadvantage to using phenolic materials for the seat is that phenolics are expensive-due in part to the cost of the material and because phenolics have to be separately molded. Separately molded seats typically involve the steps of forming a mold, pouring the seat material into the mold, removing the seat from the mold, and then installing the seat on sliding sleeves of the cementing tool.

Thus, there is a need for improved drillable seats for downhole tools, such as a cementing tool, that do not damage or clog the drill bit, are lower in cost, and can be manufactured differently than separately molded seats.

It has been discovered that a drillable seat can be made from a settable fluid, for example, a cement composition or thermoset resin. The seat solves the aforementioned problems. The seat can include 2 sleeve shoulders, which also is advantageous because the force load applied across the seat during shifting of a sleeve and pressure testing is distributed more evenly compared to a seat that only includes 1 sleeve shoulder. The seat can be manufactured directly onto a tool component instead of being separately molded.

It is to be understood that the discussion of any of the embodiments regarding the cementing tool and the seats is intended to apply to all of the method and apparatus embodiments without the need to repeat the various embodiments throughout. Any reference to the unit "gallons" means U.S. gallons.

Figure 2:
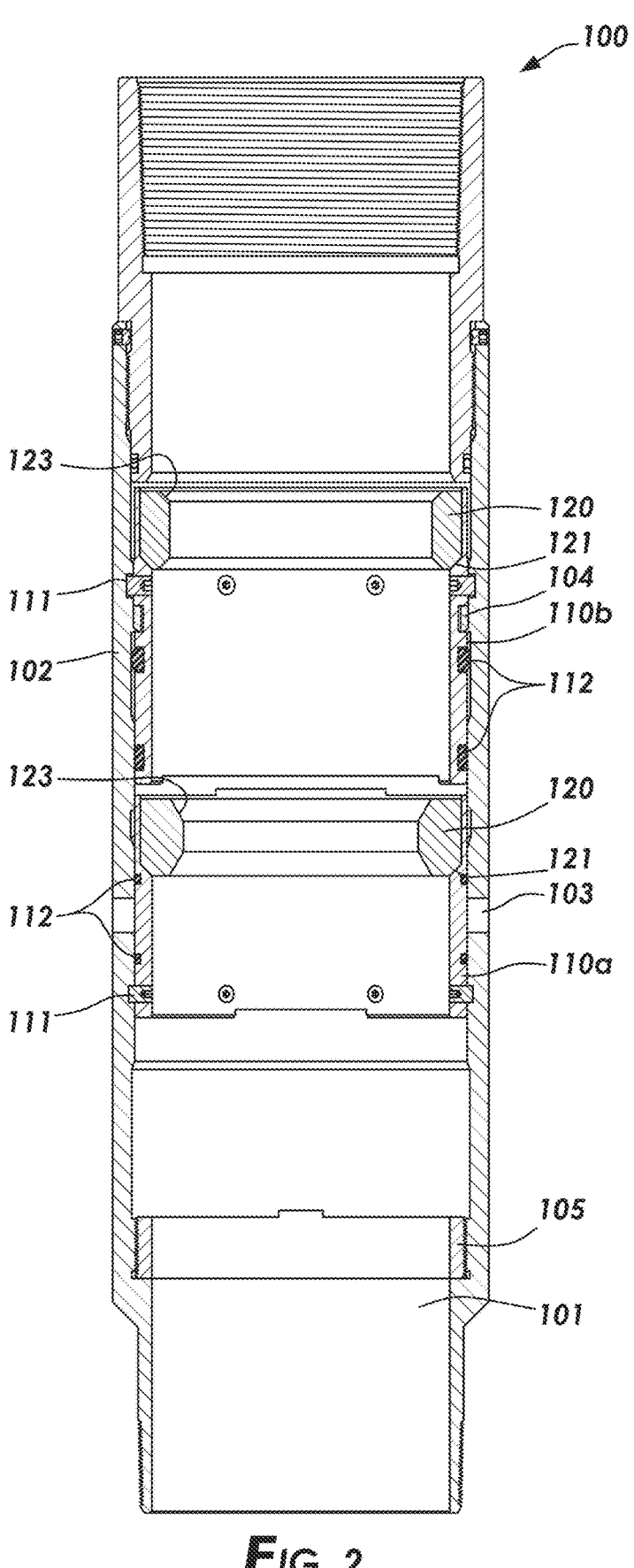
FIG. 2 is a cross-sectional view of the cementing tool of FIG. 1.

Turning to the figures, FIGS. 1 and 2 illustrate a cementing tool 100. The cementing tool 100 can be any type of tool used in a cementing operation in a wellbore. Examples of cementing tools include but are not limited to a single stage cementer, a multi-stage cementer, or packer collars. The cementing tool 100 includes a body 101. The body 101 can be configured to fit within a tubing string 140, which can be a casing string, for example, via casing box X pin connectors. The tubing string 140 and the cementing tool 100 can be introduced into a wellbore that is defined by a wellbore wall 150. The tubing string 140 can be a casing string, wherein an annulus 151 can be defined as the space located between a wellbore wall 150 and the outside of the casing string 140 and body 101 in an open-hole wellbore. For a cased wellbore, an annulus 151 can defined as the space located between the inside of a casing string and the outside of the tubing string 140 and body 101.

The cementing tool 100 can include an outer mandrel 102 located around at least a portion of the body 101. The cementing tool 100 includes at least one flow port 103. As can be seen in more detail in FIG. 2, the flow port 103 is defined by an opening that traverses through a portion of the outer mandrel 102. The opening of the flow port 103 can be a variety of dimensions and shapes. By way of an example, the diameter of the opening can range from 1 inch "in." to 10 in. The diameter of the opening can be selected, in part, based on the desired fluid volume and/or flow rate of a fluid through the flow port 103. The opening can be any shape, for example, circular, square, rectangular, or other geometric shapes. There can also be more than one flow port 103 located in a variety of spacing distances from each other. Additional flow ports may be beneficial as a redundancy measure to ensure fluid communication can be achieved.

The cementing tool 100 also includes at least one sliding sleeve 110. The sliding sleeve 110 can be a closing sleeve 110*b*. The cementing tool 100 can also include more than one sliding sleeve 110, for example the closing sleeve 110*b* and an opening sleeve 110*a*. The sliding sleeve(s) 110 are located on an inside of the outer mandrel 102. FIG. 1 shows the cementing tool 100 in the run-in stage and during a first stage of a cementing operation. During the first stage of a cementing operation, a first cement composition 160 (e.g., a lead cement slurry) can be introduced into the wellbore, for example by being pumped from a wellhead, flowed through an inside of the tubing string 140 and the cementing tool 100 in direction D1, exit a bottom end of the tubing string, and flow upwardly through the annulus 151 towards the wellhead as indicated by the upwards arrows. As used herein, the relative term "bottom" is provided for reference and means at a location farther away from a wellhead. The term "bottom" is not meant to limit the context to a vertical arrangement, but can be interpreted for horizontal wellbore portions wherein the "bottom" may be to the right or left of the orientation reference. When only a closing sleeve 110*b* is used, the first cement composition can be prevented from flowing through the flow port 103 by a port plug (not shown) that is located within the flow port. When a closing sleeve 110*b* and an opening sleeve 110*a* are used, the first cement composition can be prevented from flowing through the flow port 103 by a barrier provided by the opening sleeve 110*a*. The first cement composition 160 can displace a fluid 170 (e.g., a drilling mud or spacer fluid) from a bottom towards the top of the annulus 151.

A drillable seat 120 is in connection with and located at a top portion of the sliding sleeve 110. The cementing tool 100 can include two or more drillable seats 120, for example a first drillable seat 120 in connection with the opening sleeve 110*a*, and a second drillable seat 120 in connection with the closing sleeve 110*b*. The drillable seat 120 can include one or more sleeve shoulders 121 located on an outside of the drillable seat 120 that are in connection with an inside shoulder of the sliding sleeve 110. The drillable seat 120 also includes a plug shoulder 123 located on an inside of the drillable seat 120. As used herein, the "plug shoulder" means a shoulder for receiving any type of device that restricts fluid flow past the device. The device can be, for example, a ball or plug. It is to be understood that reference to a "ball" is not meant to limit the geometric shape of the ball to spherical but rather is meant to include any device that is capable of engaging with a seat. A "ball" can be spherical in shape, but can also be a dart, a bar, or any other shape. The device can be an opening plug or ball and/or a closing plug or ball.

The sliding sleeve 110 (i.e., the closing sleeve 110*b* and/or the opening sleeve 110*a*) are releasably connected to the outer mandrel 102 by a frangible device 111. The frangible device 111 can be any device that is capable of withstanding a predetermined amount of force and capable of releasing at a force above the predetermined amount of force. The frangible device 111 can be, for example, a shear pin, a shear screw, a shear ring, a load ring, a lock ring, a rupture disk, a pin, or a lug. There can also be more than one frangible device 111 that connects the sliding sleeve 110 to the outer mandrel 102. The frangible device 111 or multiple frangible devices can be selected based on the force rating of the device, the total number of devices used, and the predetermined amount of force needed to release the device. For example, if the total force required to break or shear the frangible device is 3,000 pounds force "lbr" and each frangible device has a rating of 1,000 lbf, then a total of three frangible devices may be used. The force rating of the frangible device 111 can vary and be selected based on the tubing string 140 weight and material grade among other factors. According to any of the embodiments, the force rating of the frangible device 111 is less than 80% of the force rating of the tubing string 140. By contrast, the force rating of the frangible device 111 can be a minimum force rating such that premature release of sliding sleeve 110 does not occur. Sealing elements 112 can also be included around an outside of the sliding sleeve 110 to help restrict fluid flow around an outside of the sliding sleeve 110 and inside of the outer mandrel 102.

At the conclusion of a first stage of cementing, subsequent stages (e.g., a second stage, third stage, etc.) can be performed. A device can be flowed through the inside of the cementing tool 100 to engage with the plug shoulder 123 of the drillable seat 120. The device engages with the plug shoulder 123, and a seal created by this engagement prevents fluid communication downstream of the drillable seat 120. A pressure differential is created after the seal is created, and the pressure differential can cause the frangible device 111 of the opening sleeve 110*a* to shear, thereby releasing the opening sleeve 110*a* from connection with the outer mandrel 102. The opening sleeve 110*a* is caused to move downward within the body 101 past the flow port 103. Continued travel of the opening sleeve 110a can be prevented by a seat retainer 105. A second cement composition can then be introduced through the cementing tool 100, out the flow port 103, and into the annulus 151. The second cement composition can have the same or different properties as the first cement composition. The second cement composition can be a tail cement slurry. Additional cement compositions can be introduced after the second cement composition. Any additional cement compositions will also flow through the flow path of the flow port 103.

At the conclusion of the subsequent stages of the cementing operation, the closing sleeve 110b can be used to block the open flow port 103. This can be accomplished by shifting the closing sleeve 110b downward within the body 101 in the same manner as was discussed in relation to the opening sleeve 110a. The closing sleeve 110b can include a lock ring 104. After the closing sleeve has shifted down and blocked the flow port 103, the lock ring 104 can engage with a component of the opening sleeve 110a to "lock" the sleeves together. As can be seen, the closing sleeve 110b is positioned above (i.e., closer to the wellhead) than the opening sleeve 110a. The closing sleeve 110b can be held in a pre-shifted position via a frangible device 111. The frangible device 111 can be the same as or different from the frangible device 111 of the opening sleeve 110a. The frangible device 111 can have the same force rating or a different force rating from the frangible device 111 of the opening sleeve 110a. The discussion above regarding the type, number, and individual force ratings of the frangible device 111 of the opening sleeve 110a apply to the discussion of the frangible device 111 of the closing sleeve 110b. The closing sleeve 110b can also include one or more sealing elements 112, such as, for example, O-rings. When both sliding sleeves 110 are used—the opening sleeve 110a and the closing sleeve 110b-then the inner diameter of the drillable seat 120 for the opening sleeve 110a is preferably less than the inner diameter of the drillable seat 120 for the closing sleeve 110b. In this manner, the device that engages with the plug shoulder 123 of the drillable seat 120 of the opening sleeve 110a can flow past the drillable seat 120 of the closing sleeve 110b, thereby opening the flow port 103 before shifting of the closing sleeve 110b.

It may be desirable to restore fluid communication through the tubing string 140, for example, after the cement compositions have set in the annulus 151. The methods can include using a drilling or milling device with a drill bit to remove all components that prevent fluid flow through the tubing string 140, for example, the balls or plugs used to shift the sliding sleeve(s) 110, the closing plug, and the drillable seat(s) 120. The lock ring 104 can prevent rotation of the opening and closing sleeves during drill out.

Turning now to FIGS. 3A and 3B, the drillable seat 120 can be formed within a seat mold 130. The seat mold 130 is located at an upper portion of the sliding sleeve 110 (i.e., the closing sleeve 110b and/or the opening sleeve 110a). According to any of the embodiments, the drillable seat 120 is made from a pourable and settable material consisting of a cement composition or consisting essentially of a curable resin. As used herein, the term "pourable" in this context means the material is able to be poured, for example into a seat mold, prior to setting after being poured into the seat mold. According to these embodiments, the drillable seat 120 can include only one sleeve shoulder 121 or two or more sleeve shoulders 121.

The cement composition includes water. The water can be selected from the group consisting of freshwater, brackish water, and saltwater, in any combination thereof in any proportion. The cement composition can also include a water-soluble salt. Preferably, the salt is selected from sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The cement composition includes cement. The cement can be a hydraulic cement. A variety of hydraulic cements can be utilized including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, pozzolan, fly ash, lime, slaked lime, sorel cements, and combinations thereof. The cement can be a calcium aluminate cement (CAC) or a calcium aluminophosphate (CAP) cement. CAP cement includes CAC cement and a phosphate source for reacting with the CAC cement and water to form the CAP cement. The exact makeup of the CAC or CAP cement can vary. The phases of the cement can also vary. By way of example, the CAC cement can contain over 35% to over 70% alumina ($Al_2O_3$). For a CAP cement, the phosphate source can be in a concentration in the range of 1% to 10% by weight of the cement. Portland cements can include those classified as Classes A, C, H, and G according to API Specification for Materials and Testing for Well Cements, Fifth Ed., Jul. 1, 1990.

The cement composition can further include other additives. Examples of other additives include, but are not limited to, a set retarder, a set accelerator, a light-weight additive, a defoaming agent, a high-density additive, elastomers, a mechanical property enhancing additive, a thixotropic additive, a viscosifying additive, a strength retrogression inhibitor, and combinations thereof. The strength retrogression inhibitor can inhibit or prevent a decrease of the compressive strength of the cement composition over a period of time.

The settable material for the drillable seat 120 can consist essentially of a curable resin. The curable resin can be any compound that is capable of curing (i.e., the process of gaining compressive strength and becoming hard). According to any of the embodiments, the curable resin is not a phenolic resin. The curable resin can be a thermoset resin. The curable resin can cure solely with heat and does not require a curing agent. According to this embodiment, the settable material will consist of the curable resin that sets via heat alone.

The settable material can consist essentially of the curable resin. It is to be understood that the transitional phrase of consisting essentially of in this context means that the settable material includes the curable resin and other materials that do not materially affect the basic and novel characteristics thereof. Accordingly, the basic and novel characteristics are that the settable material is able to—and does—gain compressive strength and becomes hard. According to this embodiment, a curing agent can be included to cause the curable resin to cure. Therefore, the settable material would not need to include, nor does it include any other ingredients besides the curable resin and the curing agent.

The curable resin can be an epoxy, diepoxy, or polyepoxy resin. For example, the curable resin can be bisphenol A glycidyldiepoxy, glycidyl propyltrimethoxysilane. As used herein, an epoxy resin is a compound that contains one epoxide functional group, a diepoxy resin is a compound containing two epoxide functional groups, and a polyepoxy resin is a compound that contains three or more epoxide functional groups. Epoxy, diepoxy, and polyepoxy resins are a class of reactive pre-polymers and polymers which contain epoxide groups. As such, the curable resin can be polymer molecules. If the curable resin is a pre-polymer, then preferably the curable resin forms a polymer before, during, or after being poured into the seat mold 130. Epoxy resins may be cross-linkable with a wide range of curing agents. As used herein, a "cross-link" and all grammatical variations thereof is a bond between two or more polymer molecules.

The curable resin can also be selected from the group consisting of polyisocyanate, polyester; vinylester, and combinations thereof. The curable resin can be a poly-glycidyl ether derivative of polyalkoxylated glycerol, polyglycerol, polyalkoxylated polyglycerol, arabitol, xylitol, manitol, sorbitol, dulcitol, or inositol. The curable resin can also be a poly-glycidyl-ether. The curable resin can be selected from the group consisting of trimethylolpropane triglycidyl ether, glycerol triglycidyl ether, pentaerythritol tetraglycidyl ether, glycerol polyethyleneoxide triglycidyl ether, glycerol polypropyleneoxide triglycidyl ether, polyglycerol-3-polyglycidyl ether, polyglycerol-3-olyethyleneoxide polyglycidyl ether, polyglycerol-3-polypropyleneoxide polyglycidyl ether, and combinations thereof.

The curable resin can be in a concentration in the range of about 0.1% to about 95% weight by weight of a resin composition that includes the curable resin and the curing agent.

The curing agent causes the curable resin to cure. Unlike other curable resins that can cure due to heat or other physical parameters, the curing agent is responsible for causing the curable resin to cure. The curing agent can also cross-link the polymer molecules of the curable resin. Examples of suitable curing agents include, but are not limited to, amines and polyamines, amides, polyimines, polyalcohols, acids, anhydrides, phenols, thiols, polycarboxylates (e.g., a dimer acid, a dimer diamine, or a trimer acid), and combinations thereof.

The curing agent can be in a concentration in the range of about 0.1% to about 10%, or about 0.5% to about 5% weight by weight of the resin composition. The curing agent can also be in a ratio of about 1:10 to about 10:1 by volume of the curable resin.

According to any of the embodiments, the settable material for the drillable seat 120 after setting has a minimum compressive strength to withstand compressive forces exerted on the seat during shearing of the frangible device of the sliding sleeves 110 and during pressure testing of the casing or tubing string. The pressures required for shifting the sliding sleeve 110 is generally dependent on the size of the casing and may be 5,000 to 10,000 psi (34.5 to 68.9 MPa) for example, while the pressure for pressure testing can be, for example, 12,000 psi (82.7 MPa) or greater. The cement composition can include additives that increase the compressive strength of the set cement composition. The cement composition can be a high-strength cement, which is generally considered to be a cement with a compressive strength greater than 10,000 psi (68.9 MPa). According to any of the embodiments, the settable material has a destructive compressive strength greater than or equal to 4,000 psi (27.6 MPa), 10,000 psi (68.9 MPa), or 25,000 psi (172.4 MPa).

The cement composition can have a setting time in a range of 12 to 48 hours. The curable resin can cure within a time ranging from 1 to 24 hours.

One very significant advantage to using a settable material such as the cement composition or curable resin is how the material reacts with a drill bit during drilling out of the seat. When the weight of the drill bit makes contact with the seat, the set cement or cured resin shatters into pieces. Because of this shattering, there is no damage to the drill bit, unlike seats made from other materials like aluminum.

With reference to FIGS. 3B and 4, the drillable seat 120 can include two or more sleeve shoulders 121 and the plug shoulder 123. According to this embodiment, the drillable seat 120 can be made from any material such as metals, metal alloys, phenolic resins, cement compositions, or curable resins and optionally a curing agent. Preferably, the drillable seat 120 is made from the settable material as described above. A space 122, which is a void of seat material, is located between two adjacent sleeve shoulders 121. As can be seen, a first section of the drillable seat 120 can include an angled sleeve shoulder 121, a first straight portion that is in connection with and located at a bottom portion of the sliding sleeve 110, and second straight portion perpendicular to the first straight portion (as shown) or a second angled portion that extends down from the first straight portion. The space 122 can be located between the first section of the drillable seat 120 and a second section of the drillable seat 120. The second section of the drillable seat 120 can include an angled sleeve shoulder 121, a first straight portion that is in connection with and located at a top portion of the sliding sleeve 110, and second straight portion perpendicular to the first straight portion. The plug shoulder 123 can be located on an inside of the drillable seat 120 opposite from the first straight portion of the second section. The space 122 can be located between the second straight portion of the first section and the angled sleeve shoulder 121 of the second section, for example. The space 122 can have a length ranging from 0.5 to 24 inches (1.27 to 60.96 cm). The drillable seat 120 can also include more than two sleeve shoulders 121.

As can be seen in FIG. 4, when a ball or plug (as discussed above) lands on the plug shoulder 123 of the drillable seat 120 a compressive force is applied to the drillable seat 120 in the direction indicated by the arrow on the plug shoulder 123. Because the drillable seat 120 is connected to the sliding sleeve 110, an opposite force is applied to the sleeve shoulders 121 as indicated by the arrows from the sliding sleeve. These forces remain and are translated to the sliding sleeve 110 until the force exceeds the force rating of the frangible device 111 and the frangible device shears, which causes the sliding sleeve to shift downwards. These forces are more evenly distributed across the drillable seat 120 when two or more sleeve shoulders 121 are included when compared to a seat that only has one sleeve shoulder. This significant advantage provides enhanced structural integrity to the seat and the sliding sleeve, decreases failure of the seat and sleeve, and can also reduce the overall size and dimensions of the seat compared to a seat with only one sleeve shoulder.

Methods of forming the drillable seat 120 can include forming the seat directly into an upper portion of the sliding sleeve 110. The upper portion of the sliding sleeve 110 can include the seat mold 130. The pourable and settable material in fluid form can be poured directly into the seat mold 130. A tooling piece 180 as shown in FIGS. 9A-9C can be removably attached to the upper portion of the sliding sleeve 110, for example via tape or other temporary adhesive. After attachment, the tooling piece 180 and the upper portion of the sliding sleeve 110 can be rotated clockwise 90° from the orientation shown in FIGS. 9A-9C. In this manner, the settable material can be poured into the top of tooling piece 180 and into the seat mold 130. The methods include causing or allowing the settable material to set. For a cement composition as the settable material, allowing the cement composition to set causes the cement composition to develop compressive strength and become hard. For a curable resin as the settable material, heat can be applied to the resin in the case of a curable resin that only requires heat to cure; or allowing the curable resin to cure (set) in the case where a curing agent is used, causes the curable resin to develop compressive strength and become hard. After the settable material has set, the tooling piece 180 can be removed from the upper portion of the sliding sleeve 110. These methods offer several advantages over current methods of manufacturing a seat, such as using separately molded seats. By having the seat mold 130 included directly in the upper portion of the sliding sleeve 110 instead of a separate mold being used, reduces time and labor in manufacturing the seat, reduces the cost of the seat, does not require an already formed seat in a separate mold to be installed within the sliding sleeve, and can eliminate reliance on a third-party that manufactures separately molded seats.

Figure 5B:
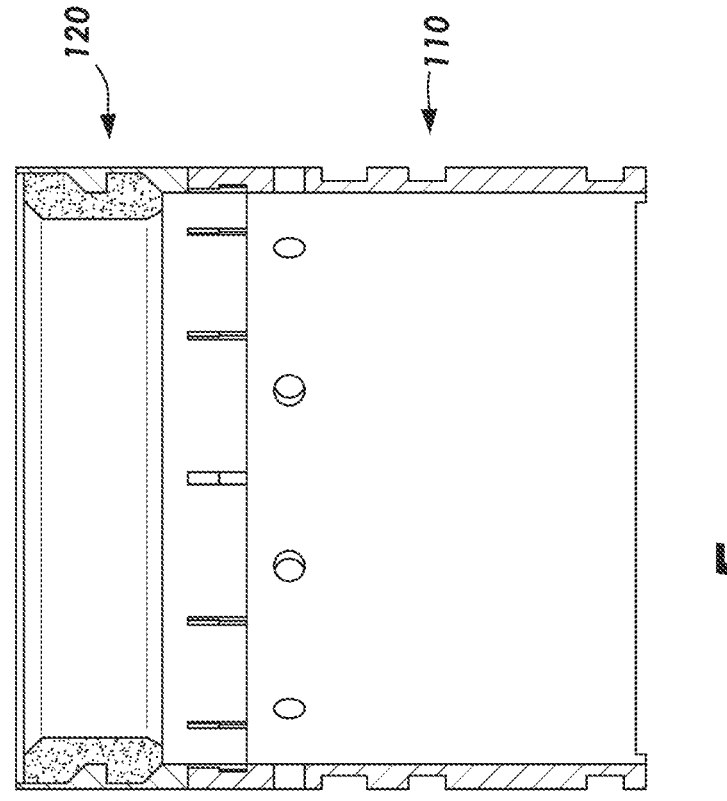
FIGS. 5A and 5B illustrate an upper portion of a sliding sleeve with the seat being attached to a lower portion of the sleeve via collet fingers according to any of the embodiments.
Figure 5A:
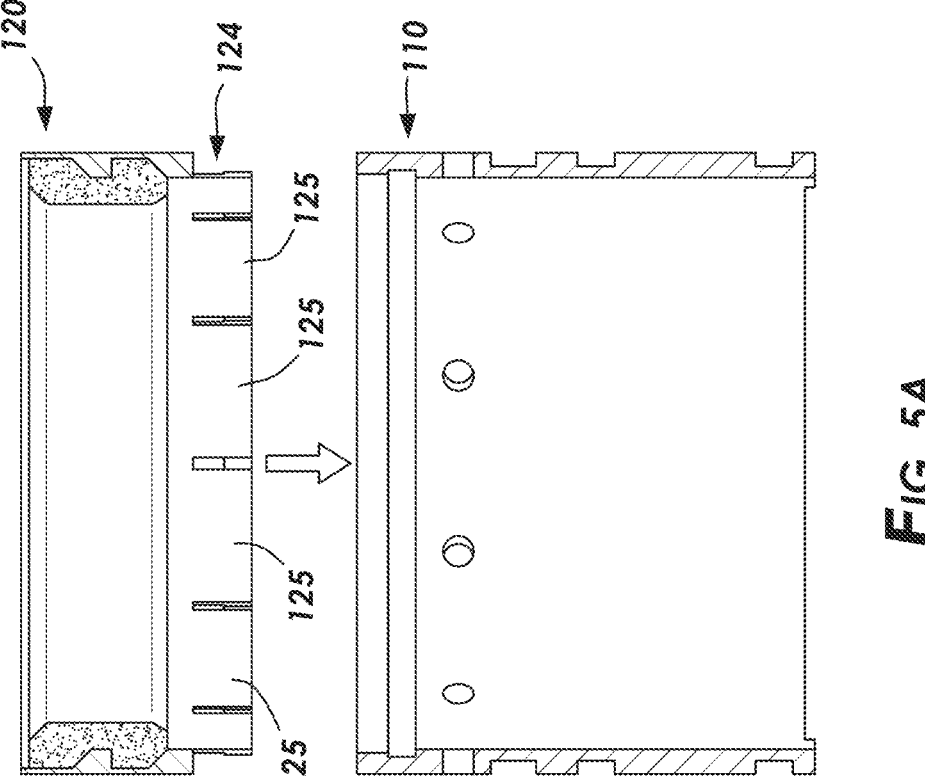

Turning now to FIGS. 5A-7, the drillable seat 120 can be molded just into the upper portion of the sliding sleeve 110 and then attached to the lower portion of the sliding sleeve 110. After the upper portion and the lower portion are attached to each other, the sliding sleeve 110 can then be installed on the cementing tool 100. The upper portion of the sliding sleeve 110 can include a locking mechanism 124. As can be seen in FIGS. 5A and 5B, the locking mechanism 124 can be a collet, and the upper portion of the sliding sleeve 110 can include a plurality of collet fingers 125. The upper portion of the sliding sleeve 110 can be secured to the lower portion of the sliding sleeve 110 by pressing the two pieces together where the collet fingers 125 lock the upper portion of the sliding sleeve 110 to the lower portion of the sliding sleeve 110.

Figure 6B:
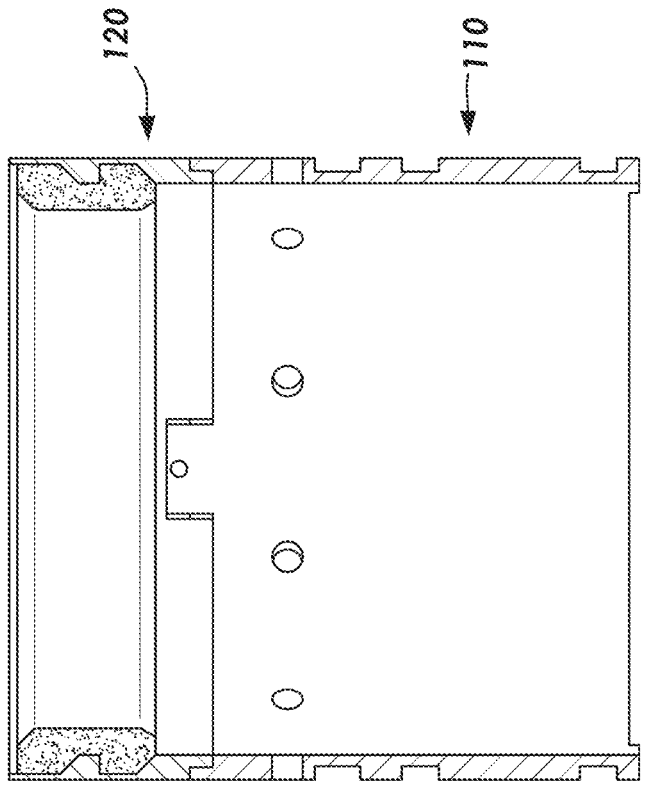
FIGS. 6A and 6B illustrate the seat being attached to a sleeve via a tab according to any of the embodiments.
Figure 6A:
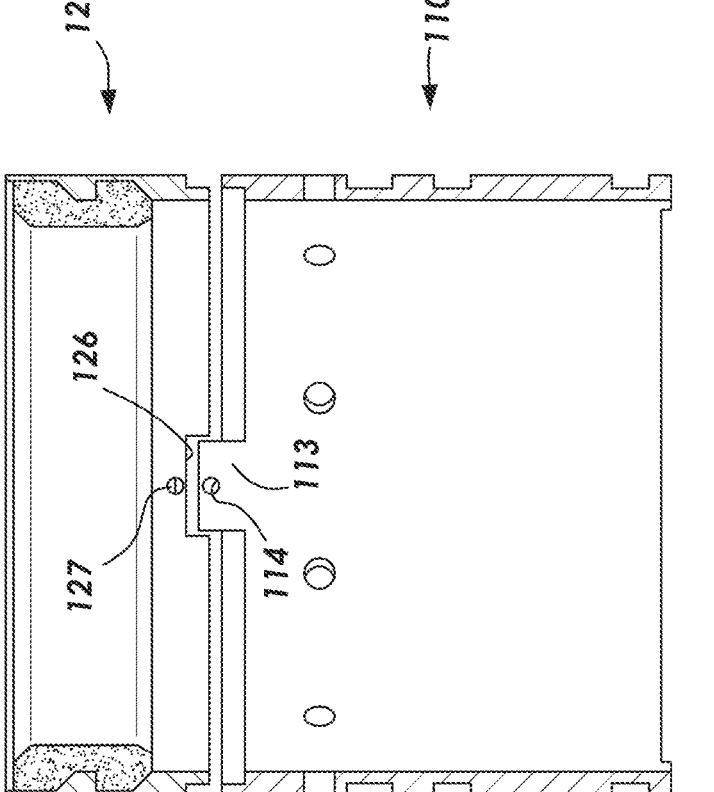

With reference to FIGS. 6A and 6B, the locking mechanism 124 can be a pinned connection. The upper portion of the sliding sleeve 110 can include a tab receiver 126, which can be a recessed area on the upper portion. The tab receiver 126 can be dimensioned for receiving a tab 113 located on the lower portion of the sliding sleeve 110. The tab receiver 126 can include a locking pin 127 that extends up from the outside of the upper portion. The tab 113 can include a hole 114 that is dimensioned to receive the locking pin 127. The upper portion of the sliding sleeve 110 that includes the drillable seat 120 can be secured to the lower portion by moving the two pieces together, aligning the tab 113 with the tab receiver 126, and ensuring that the locking pin 127 mates with and engages within the hole 114. The height and diameter or outer perimeter of the locking pin 127 can be selected such that the two pieces are locked together after being secured.

Figures 7, 8:
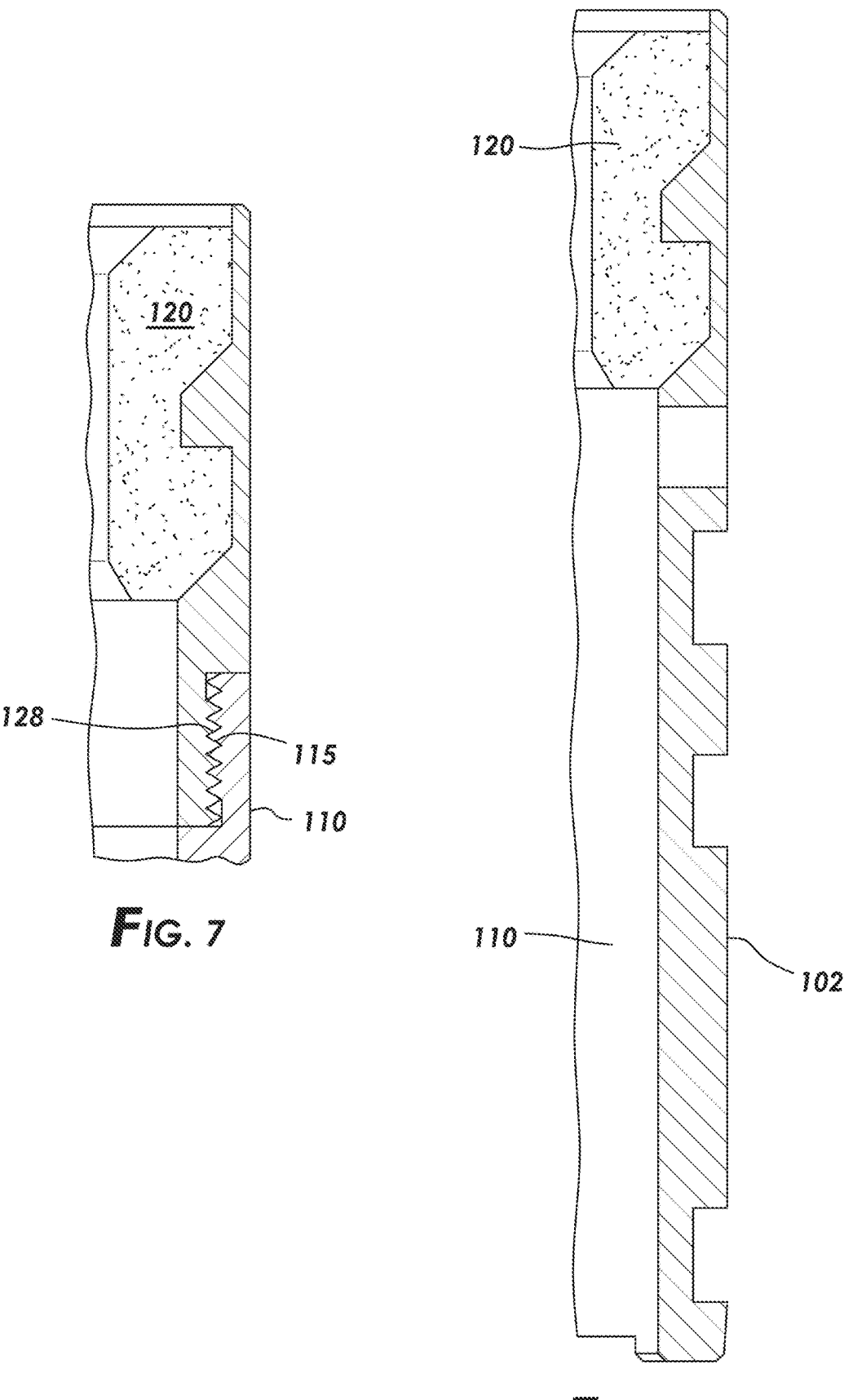
FIG. 7 illustrates the seat being attached to a sleeve via threads according to any of the embodiments.
FIG. 8 illustrates the seat being formed with the seat and sleeve as a single piece according to any of the embodiments.

With reference to FIG. 7, the locking mechanism 124 can be a threaded connection. The upper portion of the sliding sleeve 110 that includes the drillable seat 120 can include threads 128, and the lower portion can include corresponding threads 115. By way of example, the threads 128 can be male threads and the threads 115 can be female threads. In this manner, the upper portion of the sliding sleeve 110 can be secured to the lower portion by screwing the two pieces together via the threads 128 and 115.

According to any of the other embodiments and with reference to FIG. 8, the sliding sleeve 110 is a single unit and does not include a separate upper portion and lower portion that are later connected together. According to these embodiments, the settable material in fluid form for the drillable seat 120 is poured into the seat mold 130 and allowed to set. After the settable material has set, the sliding sleeve 110 can be installed on the cementing tool 100. It is to be understood that the discussion pertaining to "the sliding sleeve 110" with reference to FIGS. 5A-8 includes the closing sleeve 110b if a port plug is used for the flow port 103 and includes the closing sleeve 110b and the opening sleeve 110a when a port plug is not used.

After being fully assembled, the cementing tool 100 can be introduced into a wellbore and single-stage or multi-stage cementing operation can be performed. At the conclusion of the cementing operations, the components such as the drillable seat(s) 120 can be drilled out.

An embodiment of the present disclosure is a drillable seat for use in an oil and gas tool, the seat comprising: one or more sleeve shoulders located on an outside of the drillable seat; and a plug shoulder located on an inside of the drillable seat, wherein the drillable seat is made from a pourable and settable material consisting of a cement composition or consisting essentially of a curable resin. Optionally, the cement composition comprises water, and wherein the water is selected from the group consisting of freshwater, brackish water, and saltwater, in any combination thereof in any proportion. Optionally, the cement composition comprises cement, and wherein the cement is selected from the group consisting of Portland cements, gypsum cements, high alumina content cements, slag cements, high magnesia content cements, pozzolan, fly ash, lime, slaked lime, sorel cements, and combinations thereof. Optionally, the cement composition comprises an additive selected from the group consisting of a set retarder, a set accelerator, a light-weight additive, a defoaming agent, a high-density additive, elastomers, a mechanical property enhancing additive, a thixotropic additive, a viscosifying additive, a strength retrogression inhibitor, and combinations thereof. Optionally, the curable resin is a thermoset resin. Optionally, the curable resin is selected from the group consisting of an epoxy resin, diepoxy resin, polyepoxy resin, bisphenol A glycidyldiepoxy, glycidyl propyltrimethoxysilane, polyisocyanate, polyester, vinylester, a poly-glycidyl-ether, a poly-glycidyl ether derivative of: polyalkoxylated glycerol, polyglycerol, polyalkoxylated polyglycerol, arabitol, xylitol, manitol, sorbitol, dulcitol, or inositol, and combinations thereof. Optionally, the settable material consists of the curable resin and a curing agent, and wherein the curing agent is selected from the group consisting of amines and polyamines, amides, polyimines, polyalcohols, acids, anhydrides, phenols, thiols, polycarboxylates, and combinations thereof.

Another embodiment of the present disclosure is a method of forming a drillable seat for use in an oil and gas tool comprising: removably attaching a tooling piece to an upper portion of a sliding sleeve, wherein the upper portion of the sliding sleeve comprises a seat mold; pouring a settable material into the seat mold; causing or allowing the settable material to set; and removing the tooling piece from the upper portion of the sliding sleeve. Optionally, the method further comprises: installing the sliding sleeve onto a cementing tool; performing a cementing operation with the cementing tool; and using a drilling or milling device with a drill bit to drill out at least the drillable seat after the cementing operation has been performed. Optionally, the sliding sleeve is a single unit. Optionally, the sliding sleeve comprises the upper portion and a lower portion, wherein the upper portion and the lower portion are separatable from each other, and wherein at least the upper portion comprises a locking mechanism. Optionally, the method further comprises attaching the upper portion to the lower portion after the settable material has set. Optionally, the locking mechanism is a collet, wherein the upper portion comprises a plurality of collet fingers, and wherein the collet and collet fingers lock the upper portion and the lower portion together. Optionally, the upper portion of the sliding sleeve comprises a tab receiver and a locking pin; the lower portion of the sliding sleeve comprises a tab and a hole, wherein the hole is dimensioned to receive the locking pin; and wherein the tab receiver, locking pin, tab, and hole lock the upper portion and the lower portion together. Optionally, the locking mechanism is a threaded connection, wherein the upper portion comprises threads and the lower portion comprises corresponding threads, and wherein the threads lock the upper portion and the lower portion together. Optionally, the settable material consists of a cement composition or consists essentially of a curable resin. Optionally, the cement composition comprises water, and wherein the water is selected from the group consisting of freshwater, brackish water, and saltwater, in any combination thereof in any proportion. Optionally, the cement composition comprises cement, and wherein the cement is selected from the group consisting of Portland cements, gypsum cements, high alumina content cements, slag cements, high magnesia content cements, pozzolan, fly ash, lime, slaked lime, sorel cements, and combinations thereof. Optionally, the cement composition comprises an additive selected from the group consisting of a set retarder, a set accelerator, a light-weight additive, a defoaming agent, a high-density additive, elastomers, a mechanical property enhancing additive, a thixotropic additive, a viscosifying additive, a strength retrogression inhibitor, and combinations thereof. Optionally, the curable resin is a thermoset resin. Optionally, the curable resin is selected from the group consisting of an epoxy resin, diepoxy resin, polyepoxy resin, bisphenol A glycidyldiepoxy, glycidyl propyltrimethoxysilane, polyisocyanate, polyester, vinylester, a poly-glycidyl-ether, a poly-glycidyl ether derivative of: polyalkoxylated glycerol, polyglycerol, polyalkoxylated polyglycerol, arabitol, xylitol, manitol, sorbitol, dulcitol, or inositol, and combinations thereof. Optionally, the settable material consists of the curable resin and a curing agent, and wherein the curing agent is selected from the group consisting of amines and polyamines, amides, polyimines, polyalcohols, acids, anhydrides, phenols, thiols, polycarboxylates, and combinations thereof.

Another embodiment of the present disclosure is a cementing tool for cementing in a wellbore, the cementing tool comprising: a body configured to fit within a tubing string; an outer mandrel; a sliding sleeve located on an inside of the outer mandrel; and a drillable seat in connection with and located at a top portion of the sliding sleeve, wherein the seat comprises: two or more sleeve shoulders located on an outside of the drillable seat; a space located between the two or more sleeve shoulders; and a plug shoulder located on an inside of the drillable seat. Optionally, the cementing tool further comprises at least one flow port that traverses from an inside of the cementing tool through the outer mandrel. Optionally, a port plug is temporarily located within the flow port and wherein the sliding sleeve is a closing sleeve. Optionally, the sliding sleeve is an opening sleeve, and wherein the cementing tool further comprises: a closing sleeve; and a second drillable seat in connection with and located at a top portion of the closing sleeve. Optionally, the second drillable seat comprises: two or more sleeve shoulders located on an outside of the drillable seat; a space located between the two or more sleeve shoulders; and a plug shoulder located on an inside of the drillable seat.

Optionally, the drillable seat is made from a pourable and settable material consisting of a cement composition or consisting essentially of a curable resin. Optionally, the cement composition comprises water, and wherein the water is selected from the group consisting of freshwater, brackish water, and saltwater, in any combination thereof in any proportion. Optionally, the cement composition comprises cement, and wherein the cement is selected from the group consisting of Portland cements, gypsum cements, high alumina content cements, slag cements, high magnesia content cements, pozzolan, fly ash, lime, slaked lime, sorel cements, and combinations thereof. Optionally, the cement composition comprises an additive selected from the group consisting of a set retarder, a set accelerator, a light-weight additive, a defoaming agent, a high-density additive, elastomers, a mechanical property enhancing additive, a thixotropic additive, a viscosifying additive, a strength retrogression inhibitor, and combinations thereof. Optionally, the curable resin is a thermoset resin. Optionally, the curable resin is selected from the group consisting of an epoxy resin, diepoxy resin, polyepoxy resin, bisphenol A glycidyldiepoxy, glycidyl propyltrimethoxysilane, polyisocyanate, polyester, vinylester, a poly-glycidyl-ether, a poly-glycidyl ether derivative of: polyalkoxylated glycerol, polyglycerol, polyalkoxylated polyglycerol, arabitol, xylitol, manitol, sorbitol, dulcitol, or inositol, and combinations thereof. Optionally, the settable material consists of the curable resin and a curing agent, and wherein the curing agent is selected from the group consisting of amines and polyamines, amides, polyimines, polyalcohols, acids, anhydrides, phenols, thiols, polycarboxylates, and combinations thereof.

Therefore, the apparatus, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more sleeve shoulders, sliding sleeves, portions, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A drillable seat for use in an oil and gas tool, the seat comprising:

one or more sleeve shoulders located on an outside of the drillable seat that are in connection with an inside shoulder of a sliding sleeve, wherein the one or more sleeve shoulders comprise an angled portion; and a plug shoulder located on an inside of the drillable seat, wherein the drillable seat is configured to receive a compressive force in a first direction at the location of the plug shoulder and a compressive force in a second direction that is opposite from the first direction at the location of the one or more sleeve shoulders, and wherein the drillable seat is made from a pourable and settable material consisting of a cement composition.

2. The drillable seat according to claim 1, wherein the cement composition comprises water, and wherein the water is selected from the group consisting of freshwater, brackish water, and saltwater, in any combination thereof in any proportion.

3. The drillable seat according to claim 2, wherein the cement composition comprises cement, and wherein the cement is selected from the group consisting of Portland cements, gypsum cements, high alumina content cements, slag cements, high magnesia content cements, pozzolan, fly ash, lime, slaked lime, sorel cements, and combinations thereof.

4. The drillable seat according to claim 1, wherein the cement composition comprises an additive selected from the group consisting of a set retarder, a set accelerator, a light-weight additive, a defoaming agent, a high-density additive, elastomers, a mechanical property enhancing additive, a thixotropic additive, a viscosifying additive, a strength retrogression inhibitor, and combinations thereof.

5. The drillable seat according to claim 1, wherein the drillable seat comprises a second sleeve shoulder comprising an angled portion, and wherein a space is located between the sleeve shoulder and the second sleeve shoulder.

6. The drillable seat according to claim 5, wherein the sleeve shoulder is located at a first section of the drillable seat, and the second sleeve shoulder is located at a second section of the drillable seat.

7. The drillable seat according to claim 6, wherein the first section comprises the angled portion of the sleeve shoulder, a first straight portion that is in connection with and located at a bottom portion of the sliding sleeve, and second straight portion perpendicular to the first straight portion; and wherein the second section comprises the angled portion of the second sleeve shoulder, a first straight portion that is in connection with and located at a top portion of the sliding sleeve, and a second straight portion perpendicular to the first straight portion.

8. A method of forming a drillable seat for use in an oil and gas tool comprising:

removably attaching a tooling piece to an upper portion of a sliding sleeve, wherein the upper portion of the sliding sleeve comprises a seat mold;

pouring a settable material into the seat mold, wherein the settable material consists of a cement composition;

causing or allowing the settable material to set; and removing the tooling piece from the upper portion of the sliding sleeve, wherein the drillable seat comprises;

one or more sleeve shoulders located on an outside of the drillable seat that are in connection with an inside shoulder of the sliding sleeve, wherein the one or more sleeve shoulders comprise an angled portion; and a plug shoulder located on an inside of the drillable seat, wherein the drillable seat is configured to receive a compressive force in a first direction at the location of the plug shoulder and a compressive force in a second direction that is opposite from the first direction at the location of the one or more sleeve shoulders.

9. The method according to claim 8, further comprising:

installing the sliding sleeve onto a cementing tool;

performing a cementing operation with the cementing tool; and using a drilling or milling device with a drill bit to drill out at least the drillable seat after the cementing operation has been performed.

10. The method according to claim 8, wherein the sliding sleeve is a single unit.

11. The method according to claim 8, wherein the sliding sleeve comprises the upper portion and a lower portion, wherein the upper portion and the lower portion are separatable from each other, and wherein at least the upper portion comprises a locking mechanism.

12. The method according to claim 11, further comprising attaching the upper portion to the lower portion after the settable material has set.

13. The method according to claim 12, wherein the locking mechanism is a collet, wherein the upper portion comprises a plurality of collet fingers, and wherein the collet and collet fingers lock the upper portion and the lower portion together.

14. The method according to claim 12, wherein:

the upper portion of the sliding sleeve comprises a tab receiver and a locking pin;

the lower portion of the sliding sleeve comprises a tab and a hole, wherein the hole is dimensioned to receive the locking pin; and wherein the tab receiver, locking pin, tab, and hole lock the upper portion and the lower portion together.

15. The method according to claim 12, wherein the locking mechanism is a threaded connection, wherein the upper portion comprises threads and the lower portion comprises corresponding threads, and wherein the threads lock the upper portion and the lower portion together.

16. The method according to claim 8, wherein the cement composition comprises cement, and wherein the cement is selected from the group consisting of Portland cements, gypsum cements, high alumina content cements, slag cements, high magnesia content cements, pozzolan, fly ash, lime, slaked lime, sorel cements, and combinations thereof.

17. The method according to claim 8, wherein the cement composition comprises an additive selected from the group consisting of a set retarder, a set accelerator, a light-weight additive, a defoaming agent, a high-density additive, elastomers, a mechanical property enhancing additive, a thixotropic additive, a viscosifying additive, a strength retrogression inhibitor, and combinations thereof.

18. The method according to claim 8, wherein the drillable seat comprises a second sleeve shoulder comprising an angled portion, and wherein a space is located between the sleeve shoulder and the second sleeve shoulder.

19. The method according to claim 18, wherein the sleeve shoulder is located at a first section of the drillable seat, and the second sleeve shoulder is located at a second section of the drillable seat.

20. The method according to claim 19, wherein the first section comprises the angled portion of the sleeve shoulder, a first straight portion that is in connection with and located at a bottom portion of the sliding sleeve, and second straight portion perpendicular to the first straight portion; and wherein the second section comprises the angled portion of the second sleeve shoulder, a first straight portion that is in connection with and located at a top portion of the sliding sleeve, and a second straight portion perpendicular to the first straight portion.

* * * * *